United States Patent [19]

Iwabuchi et al.

[11] Patent Number: 5,942,122
[45] Date of Patent: Aug. 24, 1999

[54] METHOD OF DEODORIZING ION-EXCHANGED PURIFIED WATER

[75] Inventors: Muneyuki Iwabuchi, Fujisawa; Hiroshi Shimizu, Tokyo, both of Japan

[73] Assignees: NGK Insulators, Ltd.; NGK Filtech Ltd., both of Japan

[21] Appl. No.: 08/625,149

[22] Filed: Apr. 1, 1996

[30] Foreign Application Priority Data

Apr. 6, 1995 [JP] Japan ..................................... 7-081188
May 19, 1995 [JP] Japan ..................................... 7-121120

[51] Int. Cl.⁶ ....................................................... C02F 1/42
[52] U.S. Cl. ........................... 210/670; 210/686; 210/916
[58] Field of Search ................................... 210/670, 681, 210/685, 686, 916

[56] References Cited

U.S. PATENT DOCUMENTS

| | | | |
|---|---|---|---|
| 3,985,648 | 10/1976 | Casolo | 210/669 |
| 4,025,705 | 5/1977 | Corte et al. | 210/916 |
| 4,147,717 | 4/1979 | Kershaw | 260/465.8 R |
| 4,239,621 | 12/1980 | Heskett | 210/687 |
| 4,421,652 | 12/1983 | Heskett | 210/916 |
| 4,564,455 | 1/1986 | Flynn et al. | 210/686 |
| 4,820,421 | 4/1989 | Auerswald | 210/670 |
| 5,043,075 | 8/1991 | Dietmar et al. | 210/664 |

FOREIGN PATENT DOCUMENTS

| | | |
|---|---|---|
| 0 402 347 | 12/1990 | European Pat. Off. . |
| 3037850 | 4/1982 | Germany . |
| 93 16959 | 9/1993 | WIPO . |

OTHER PUBLICATIONS

Patent Abstract of Japan, vol. 13, No. 227 (C–600) & JP–A–01 038192 (Japan Organo), Feb. 8, 1989, abstract.

"Technic and Management for Treating a Water by Using an Activated Carbon," Nikkan Kogyo Sha, (1978), p. 130.

*Primary Examiner*—Ivars Cintins
*Attorney, Agent, or Firm*—Parkhurst & Wendel, L.L.P

[57] ABSTRACT

An ion-exchanged purified water having an odor substance generated from a double bed type purified water producing apparatus and a mix bed type purified water producing apparatus is flowed through a hydrogen type weak acid cation exchange resin to obtain an odor-free refined purified water. Moreover, an original water is passed through a single ion-exchange tower in which a mix resin layer of a regenerated mix bed type purified water producing portion is arranged at an upper portion and a hydrogen type strong acid cation exchange resin of a polisher portion is arranged at a lower portion, so that an odor substance in the ion-exchanged purified water generated from the mix bed type purified water producing portion is removed by the polisher portion and the odor-free purified water is obtained.

1 Claim, 11 Drawing Sheets

FIG_3
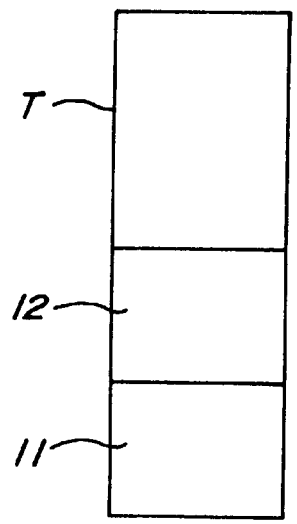
FIG_4
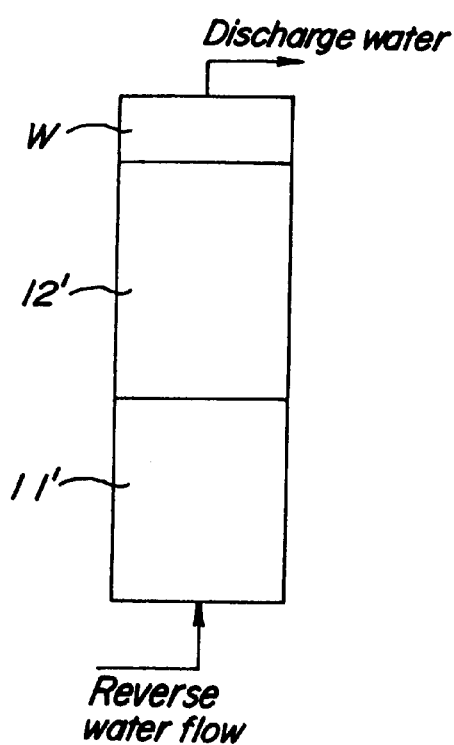

FIG_9
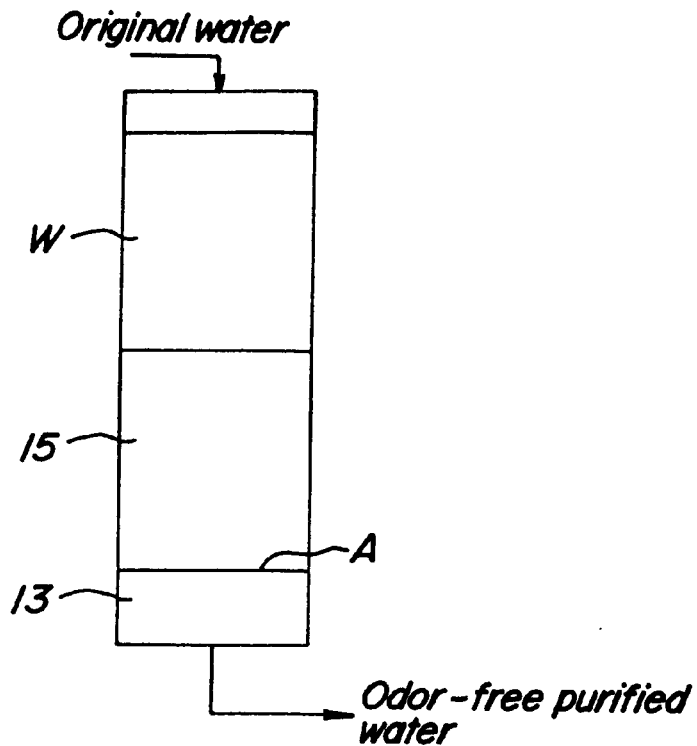
FIG_10
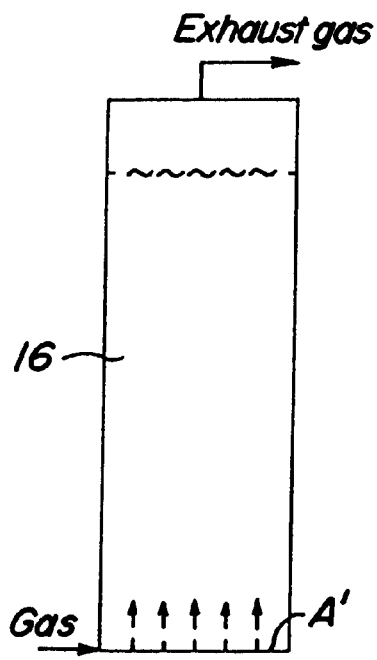

FIG_17
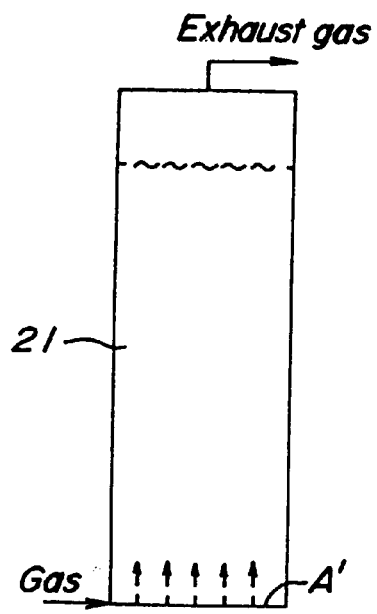
FIG_18
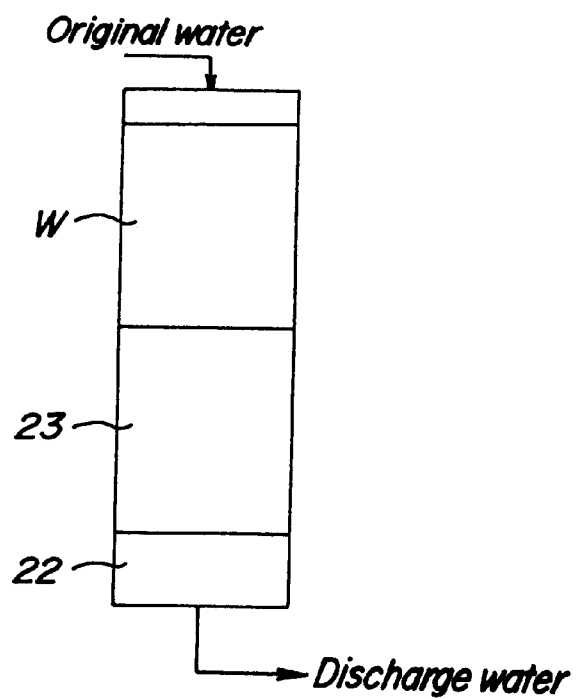

METHOD OF DEODORIZING ION-EXCHANGED PURIFIED WATER

BACKGROUND OF THE INVENTION

1. Field of the Invention

The present invention relates to a method of deodorizing an ion-exchanged purified water for removing odor substances included in an ion-exchanged purified water obtained by treating new water by means of apparatuses for producing purified water of dual and mixed types.

2. Related Art Statement

In the fields of a semiconductor manufacturing and food production, it is necessary to use purified water obtained by treating water such as from a water service supply by means of an apparatus of producing purified water. Such apparatuses for producing purified water include a dual bed type and a mixed bed type are known. In the apparatus for producing purified water of the dual bed type, a treatment is performed in such a manner that now water is first passed through a strongly acidic cation exchange resin and then passed through a strongly basic anion exchange resin. In the apparatus for producing purified water of the mixed bed type, a treatment is performed in such a manner that now water is passed through a mixed layer of a strongly acidic cation exchange resin and a strongly basic anion exchange resin.

In the apparatuses for producing purified water, since use is made of ion-exchange resins, odor substances due to the ion-exchange resins may be sometimes included in the ion-exchanged purified water. In the field of semiconductor manufacturing and so on, there is no problem if the odor substances are included in the ion-exchanged purified water. However, in the field of food production and so on, if the odor substances are included in the ion-exchanged purified water, there arises such a problem that an odor is added to the produced food. In order to solve this problem, a method of deodorizing the ion-exchanged purified water by means of an activated carbon is disclosed in for example "Technic and management for treating a water by using an activated carbon," Nikkan Kogyo Sha (1978), page 130.

However, in the method of deodorizing the ion-exchanged purified water by means of an activated carbon mentioned above, there are following disadvantages (1)–(3).

(1) Contamination of a treated water due to a salt component and an alkali component;

In the case of treating the ion-exchanged purified water by using an activated carbon, since impurities such as a salt component, an alkali component and so on are dissolved into the treated water from an activated carbon, the treated water is contaminated, so that the purity of the ion-exchanged purified water is decreased.

(2) Contamination of a treated water due to microorganisms:

Since activated carbon has a porous structure and thus becomes a suitable medium for microorganisms, a large number of microorganisms are propagated in the activated carbon. Therefore, if the ion-exchanged purified water is treated by using activated carbon, these microorganisms are included in the treated water and the treated water is contaminated. In this manner, the treated water becomes unsanitary and thus it is not used for food production.

(3) Frequent sterilizing treatments and regeneration treatments of activated carbon;

In order to regenerate an odor removing facility of the activated carbon and to sterilize the propagated microorganisms in the activated carbon, it is necessary to fire the activated carbon and to treat the activated carbon by using a high temperature steam. Moreover, the sterilizing treatment and the regenerative treatment of the activated carbon must be performed frequently.

SUMMARY OF THE INVENTION

An object of a first aspect of the invention is to eliminate the drawbacks mentioned above and to provide a method of deodorizing an ion-exchanged purified water in which an odor substance can be removed from the ion-exchanged purified water.

Another object of the first aspect of the invention is to provide a method of deodorizing an ion-exchanged purified water in which a purity of the ion-exchanged purified water can be improved as well as an odor removing facility.

According to the first aspect of the invention, a method of deodorizing an ion-exchanged purified water comprises a step of treating an odor substance in an ion-exchanged purified water by using a hydrogen type weakly acidic cation exchange resin, so as to remove the odor substance from the ion-exchanged purified water.

In the ion-exchanged purified water which is generated by the dual bed type or the mixed bed type purified water producing apparatus in which a strongly acidic cation exchange resin and a strongly basic anion exchange resin are combined, an odor substance such as amine or its analogous element generated from the strongly basic anion exchange resin exists. The odor substance is mainly made of a little amount of a dissolved substance generated from the strongly basic anion exchange resin or amine or its analogous element which is a decomposed substance of a quaternary ammonium group. Therefore, the odor substance has an amine odor. In the first aspect of the invention, the odor substance generating an amine odor is removed from the ion-exchanged purified water by using a hydrogen type weakly acidic cation exchange resin, so as to deodorize the ion-exchanged purified water.

Moreover, in the ion-exchanged purified water produced by using the dual bed type purified water producing apparatus, a base (alkali) substance due to a salt or its analogous element in raw water is included as well as the odor substance. In the first aspect of the invention, since the ion-exchanged water is treated by the hydrogen type weakly acidic cation exchange resin, the base substance can be neutralized and thus removed from the ion-exchanged water. Therefore, a pH value of the ion-exchanged purified water can be made closer to a neutral state as well as the deodorizing of the ion-exchanged water, and also the electric conductivity of the ion-exchanged purified water can be decreased, so that the purity of the ion-exchanged purified water can be improved. Further, since use is made of the hydrogen type weakly acidic cation exchange resin, it is possible to make a regeneration operation easier. In addition, since the regeneration operation is performed by applying a thermal caustic treating or a mineral acid treating using hydrochloric acid or sulfuric acid to the hydrogen type weakly acidic cation exchange resin, it is possible to sterilize the hydrogen type weakly acidic action exchange resin, and thus it is possible to prevent a microorganism contamination of the purified water.

An object of a second aspect of the invention is to provide a method of deodorizing an ion-exchanged purified water obtained by using a mixed bed type purified water producing apparatus in which an odor substance in the ion-exchanged purified water can be removed by polishing the ion-exchanged purified water by means of a hydrogen type strongly acidic cation exchange resin.

According to the second aspect of the invention, a method of deodorizing an ion-exchanged purified water comprises a step of flowing an ion-exchanged water having an odor substance generated from a mixed bed purified water producing portion having a mixed resin tower including a strongly acidic cation exchange resin and a strongly basic anion exchange resin through a polishing portion having a hydrogen type strongly acidic cation exchange resin layer arranged at a downstream position of said mixed resin tower, so as to remove the odor substance from the ion-exchanged purified water. In the method according to the second aspect of the invention, as the strongly acidic cation exchange resin in the polishing portion, it is preferred to use the strongly acidic cation exchange resin having a sedimentation rate larger than that of the strongly acidic cation exchange resin in the mixed bed type purified water producing portion.

In the method of deodorizing the ion-exchanged purified water generated from mixed bed purified water producing apparatus according to the second aspect of the invention, use is made of two types of systems mentioned below.

(1) System of generating a mixed bed layer by introducing a gas from a boundary between a regenerated strongly acidic cation exchange resin in the mixed bed type purified water producing portion and a regenerated strongly acidic cation exchange resin in the polishing portion:

In a system in which the strongly acidic cation exchange resin layer in the polishing portion is arranged at a downstream position of the mixed resin layer in the mixed bed type purified water producing portion, prior to performing a system regeneration operation, water is flowed from a downstream position of the strongly acidic cation exchange resin layer in the polishing portion to an upstream position, so that the mixed resin tower is separated into the strongly basic anion exchange resin layer, the strongly acidic cation exchanged layer in the polishing portion from an upstream side to a downstream side. Then the strongly basic anion exchange resin is regenerated by using a caustic alkali solution. Moreover, a mineral acid solution is flowed from a lowermost portion of the mixed resin tower to an upstream portion so as to regenerate the strongly acidic cation exchange resin layer in the polishing portion and then regenerate the strongly acidic cation exchange resin layer in the mixed bed type purified water producing portion. Then, a gas such as air or nitrogen is introduced from a boundary between the regenerated strongly acidic cation exchanged layer of the mixed bed type purified water producing portion and the regenerated strongly acidic cation exchange resin layer of the polishing portion toward an upstream portion, so that the mixed resin layer of the mixed bed type purified water producing portion is arranged at an upstream position of the boundary and the strongly acidic cation exchange resin layer of the polishing portion is arranged at a downstream position of the boundary.

(2) In the system (1), system of generating the polishing portion at its lower portion and the mixed bed type purified water producing portion at its upper portion by introducing a gas for mixing resins from the lowermost portion of the resin tower:

In the system (1), a gas for mixing resins is introduced from the lowermost portion of the regenerated strongly acidic cation exchange resin layer for the polishing toward an upstream side so as to mix all the resin layers. Then, a gas supply is stopped to form the polishing layer at its lower portion and to form the mixed bed type mixed resin layer at its upper portion.

In the ion-exchanged purified water generated from the mixed bed purified water producing portion having a mixed resin layer including a hydrogen type strongly acidic cation exchange resin and a hydrogen type strongly basic anion exchange resin, there are odor substances due to amine or its analogous element generated from the strongly basic anion exchange resin. These odor substances are mainly made of a little amount of a dissolved substance generated from the strongly basic anion exchange resin, or amine or its analogous element which is a decomposed substance of a quaternary ammonium group. Therefore, the odor substance has an amine odor. In the second aspect of the invention, the odor substance generating an amine odor is removed from the ion-exchanged purified water by arranging the polishing portion having the hydrogen type strongly acidic cation exchange resin at a lower portion of the mixed resin layer, so as to deodorize the ion-exchanged purified water.

Moreover, every time the strongly acidic cation exchange resin constructing the mixed resin layer is regenerated by flowing a mineral acid solution therethrough reversely, the hydrogen type strongly acidic cation exchange resin layer used as the polishing portion is regenerated by the mineral acid solution. Therefore, the hydrogen type strongly acidic cation exchange resin layer is sterilized sufficiently, and thus a microorganism contamination in the treatment water can be preferably prevented.

In the following explanations, as the strong base anion exchange resin, use is made of a type I strongly basic anion exchange resin and a type II strongly basic anion exchange resin. In this case, a basicity and a chemical stability of the type I are stronger than those of the type II, but a regeneration efficiency of the type II is better than that of the type I.

BRIEF DESCRIPTION OF THE DRAWINGS

FIG. 3 is a schematic view showing a resin filling state in a partial mixed system according to the second aspect of the invention;

FIG. 4 is a schematic view illustrating a resin separation state by using a reverse flow in the partial mixed system according to the second aspect of the invention;

FIG. 9 is a schematic view showing a treatment state in the partial mixed system according to the second aspect of the invention;

FIG. 10 is a schematic view illustrating a resin overall mixed state in an overall mixed system according to the second aspect of the invention;

FIG. 17 is a schematic view depicting an overall mixed state in the overall mixed system using the hydrogen type strongly acidic cation exchange resin having a large sedimentation rate according to the second aspect of the invention;

FIG. 18 is a schematic view showing a layer fix and sediment state in the overall mixed system using the hydrogen type strongly acidic cation exchange resin having a large sedimentation rate according to the second aspect of the invention.

DESCRIPTION OF THE PREFERRED EMBODIMENTS

Figure 1:
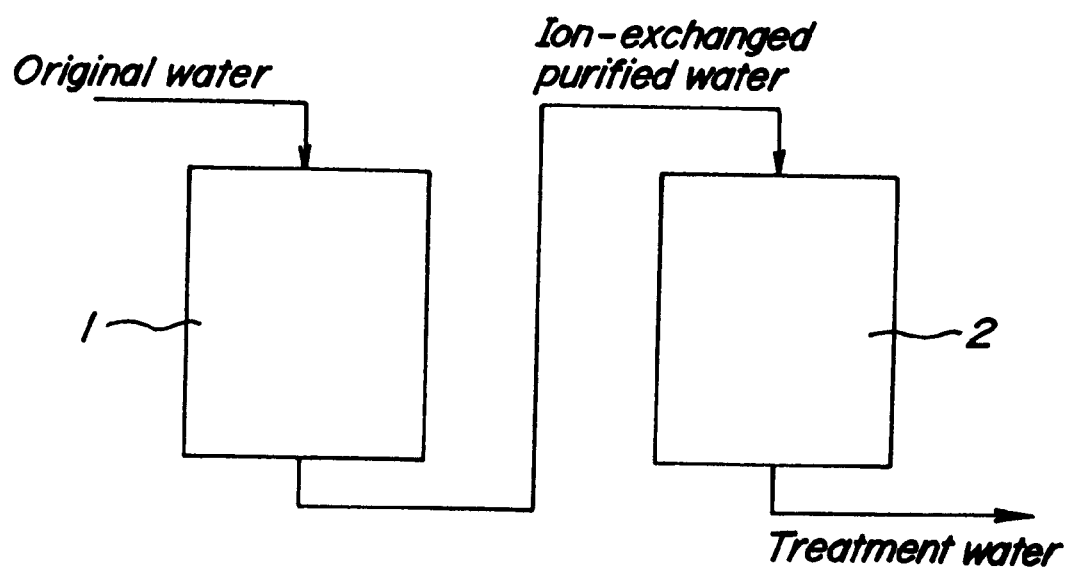
FIG. 1 is a schematic view for explaining one embodiment of a method of deodorizing ion-exchanged purified water according to a first aspect of the invention.

FIG. 1 is a schematic view for explaining one embodiment of a method of deodorizing ion-exchanged purified water according to a first aspect of the invention. In FIG. 1, new water such as service water is treated by a purified water producing apparatus 1 to obtain an ion-exchanged purified water, and then the thus obtained purified water is treated by a hydrogen type weakly acidic cation exchange resin 2 to obtain deodorized treatment water. As the purified water producing apparatus 1, the known apparatus using an ion-exchange resin such as a dual bed type purified water producing apparatus and a mixed bed type purified water producing apparatus can be used. Hereinafter, technical features used in the first aspect of the invention will be explained.

(1) Ion-exchanged purified water:

The ion-exchanged purified water means a purified water obtained by passing raw water through the dual bed type purified water producing apparatus or the mixed bed type purified water producing which combines a strongly acidic cation exchange resin and a strongly basic anion exchange resin.

That is to say, in the dual bed type purified water producing apparatus, the purified water is obtained by passing raw water through a tower of the strongly acidic cation exchange resin which is reproduced to an H type (hydrogen type) to obtain a treatment water; passing the treatment water through a carbonic acid removing tower or a vacuum gas removing tower or no tower member to remove a gas component such as carbonic acid, oxygen and so on; and passing the degassed treatment water through a tower of the strong base cation exchange resin which is reproduced to an OH type (hydroxyl group type).

The ion-exchanged purified water generated from the dual bed type purified water producing apparatus includes a dissolved substance of the strongly basic anion exchange resin and an amine compound such as trimethylamine and dimethyl ethanol amine which is generated by decomposing a quaternary ammonium group, and thus it has an amine odor. Moreover, since a cation exchanged reaction between the H type strongly acidic cation exchange resin and raw water is mainly based on a neutral salt decomposing reaction, a reaction efficiency is not so good and thus a non-reacted salt component remains in a cation exchanged treatment water. Therefore, if the thus obtained treatment water is treated by the OH type strongly basic anion exchange resin, the non-reacted salt component becomes a corresponding caustic alkali, and thus a pH value of the treatment water is increased. Further, an electric conductivity of the treatment water is not decreased, and a purity of the generated ion-exchanged purified water is decreased.

In the mixed bed type purified water producing apparatus, the purified water is obtained by passing raw water through a mixed bed tower in which the strongly acidic cation exchange resin regenerated to the H type and the strongly basic anion exchange resin regenerated to the OH type are mixed.

In the mixed bed type purified water producing apparatus, since the dissolved substance generated from the strongly basic anion exchange resin and the amine compound such as trimethylamine and dimethyl ethanol amine which is generated by decomposing a quaternary ammonium group are absorbed by the adjacent H type strongly acidic cation exchange resin, the generated ion-exchanged purified water has little amine odor as compared with the ion-exchanged purified water generated from the dual bed type purified water producing apparatus and a higher purity. However, since an amine odor substance generated from the strongly basic anion exchange resin arranged at a lower stream position of the mixed bed zone does not have sufficient time and opportunity for contact with the adjacent strongly acidic cation exchange resin, a large amount of the amine odor substance remains in the treatment water.

(2) Strongly acidic cation exchange resin and strongly basic anion exchange resin:

As the strongly acidic cation exchange resin and the strongly basic anion exchange resin used in the dual bed type purified water producing apparatus and the mixed bed type purified water producing apparatus, known ion-exchange resins can be used.

(3) Weakly acidic cation exchange resin:

As the weakly acidic cation exchange resin, use is made of a cation exchange resin having a weakly acidic group such as a carboxyl group as an exchange group of the ion-exchange resin, i.e., polymer including methacrylic acid or acrylic acid.

It is preferred to use a cation exchange resin having an acid dissociation rate (pKa) of 4~6. The amine odor substance can be preferably absorbed if pKa is smaller, but if pKa is not larger than 4, a pH value of the treatment water is decreased in excess and the treatment water becomes acidic. Moreover, an electric conductivity is increased, and thus the purity of the treatment water is decreased. On the other hand, if pKa is not smaller than 6, a pH value of the treatment water does not become acidic, but an absorbing efficiency of the amine odor substance is decreased. Therefore, it is preferred to set pKa of the weakly acidic cation exchange resin within 4–6 in response to a property of the ion-exchanged purified water to be processed.

Moreover, the weakly acidic cation exchange resin has sometimes a low polymerization substance as an impurity. Therefore, it is necessary to take care not to use such a weakly acidic cation exchange resin by using a thermal caustic solution having a temperature of 40~60° C., and to wash the weakly acidic cation exchange resin after the thermal caustic treatment by using hot water having a temperature of 40~60° C.

A regeneration of the weakly acidic exchange resin is performed by using a mineral acid such as hydrochloric acid or sulfuric acid having a concentration of 1~10%. If the absorbed amine substance can not be removed sufficiently, it is necessary to perform the above regeneration operation after treating the weakly acidic cation exchange resin by using the thermal caustic solution having a temperature of 40~80°C.

In the first aspect of the invention, since the hydrogen type cation exchange resin used for deodorizing the ion-exchanged purified water is regenerated as mentioned above, the sterilization of the hydrogen type cation exchange resin can be performed at the same time. Therefore, in the following deodorizing step of the ion-exchanged purified water, it is possible to prevent a microorganism contamination of the deodorized treatment water.

Hereinafter, an actual embodiment according to the first aspect of the invention will be explained.

Experiment 1

Ion-exchanged purified water generated by a dual bed type purified water producing apparatus using a strongly acidic cation exchange resin and a type II strong base anion exchange resin (Sybron ASB-2HP) was deodorized by using a methacrylic acid type H type weakly acidic cation exchange resin. In the ion-exchange purified water producing step, an H type weakly acid cation exchange resin treatment step and a deodorizing step of the ion-exchanged purified water by using the H type weakly acidic cation exchange resin were performed as follows.

(1) Step of producing the ion-exchanged purified water:

In order to obtain the ion-exchanged purified water, raw water obtained by deodorizing a service water by means of active carbon was flowed through a dual bed type purified water producing apparatus which combines a cation exchange resin tower, a carbonic acid removing tower and an anion exchange resin tower. In the cation exchange resin tower, a copolymer of styrene and divinylbenzene, to which one volume unit of a strongly acidic cation exchange resin having a sulfonic acid group was added, a copolymer of styrene and divinylbenezene, to which two volume units of a type II strongly basic anion exchange resin having dimethyl ethanol ammonium group as a quaternary ammonium group was added, was filled.

That is to say, the raw water was at first flowed through the cation exchange resin tower regenerated to an H type to obtain a treatment water, and the treatment water was flowed through the carbonic acid removing tower while air was blown from a downstream position of the sulfonic acid removing tower so as to remove a free sulfonic acid and to obtain a sulfonic acid free treatment water. Then, the sulfonic acid free treatment water was flowed through the anion exchange tower regenerated to an OH type to obtain the ion-exchanged purified water. A water flow rate was adjusted in such a manner that a space velocity (SV) with respect to the anion exchange resin was 20/h. A water quality of the thus produced ion-exchanged purified water was as follows in a substantially stable state. That is to say, a pH was 8.0~8.1, an electric conductivity was 1.5~1.4 $\mu$S/cm (25° C.), a water temperature was 25° C. and a sweet amine odor was included.

(2) Step of treating the H type weakly acidic cation exchange resin:

Use was made of Ionac CC (manufactured by Sybron Chemical Co., Ltd., USA) which was the weakly acidic cation exchange resin having methacrylic acid as an exchange group of the ion-exchange resin. An acid rate of Ionac CC was pKa 5.8. In order not to include an odor in the treatment water due to impurities such as a low polymer substance in the resin, the following treatment was applied to Lonac CC. At first, a thermal caustic solution having a concentration of 4% and a temperature of 60° C. was flowed through Ionac CC until a flowed water has substantially no odor. Then, Ionac CC was washed by using a hot water having a temperature of 60° C. and then using a normal water until the wash water had no odor.

In order to regenerate the weakly acidic cation exchange resin, a thermal caustic solution having a concentration of 4% and a temperature of 60° C. was at first flowed through the weakly acidic cation exchange resin so as to remove an absorbed odor substance. Then, a remaining thermal caustic solution of the weakly acidic cation exchange resin was replaced by using hot water having a temperature of 60° C., and the weakly acidic cation exchange resin was washed and cooled by using normal water. Finally, hydrochloric acid having a concentration of 5% was flowed through the weakly acidic cation exchange resin and was washed by water to regenerate the weakly acidic cation exchange resin to the H type.

(3) Step of deodorizing the ion-exchanged purified water by using the H type weakly acidic cation exchange resin:

150 mL of the H type weakly acidic cation exchange resin treated in the manner mentioned in the above step (2) was filed in a resin cylinder having an inner diameter of 22 mm. In this case, a height of a resin layer was 39.5 mm. Then, the ion-exchanged purified water produced according to the above step (1) was flowed through the resin cylinder. In this case, a water flow rate was set to 6 L/H and a space velocity (SV) with respect to the H type weakly acidic cation exchange resin was set to 40/h. Results of deodorizing the ion-exchanged purified water were shown in the following Table 1.

resin. In the ion-exchanged purified water producing step, an H type weakly acidic cation exchange resin treatment step and a deodorizing step of the ion-exchanged purified water by using the H type weakly acidic cation exchange resin were performed as follows.

(1) Step of producing the ion-exchanged purified water:

This step was performed in the same manner as that of the experiment 1 except that a temperature of the produced ion-exchanged purified water was 21° C.

(2) Step of treating the H type weak acid cation exchange resin:

Use was made of DIAION WK20 (manufactured by Mitsubishi Kagaku Co., Ltd.) which was the weakly acidic cation exchange resin having acrylic acid as an exchange group of the ion-exchange group of the ion-exchange resin. An acid rate of DIAION WK20 was pKA 5.3. DIAION WK20 was treated in the same manner as that of the experiment 1. Moreover, a regeneration of the weakly acidic

TABLE 1

Result of deodorizing ion-exchanged purified water by using methacrylic acid type H type weak acid cation exchange resin (pKa 5.8) (Type II strong base anion exchange resin using for ion-exchanged purified water producing)

| Water flow rate (L/h) | Water flow SV (/h) | Water flow (minute) | Water flow amount (L) | Multiple Water flow amount (BV) | Water temperature (°C.) | Ion-exchanged purified water | | | Treatment water | | |
|---|---|---|---|---|---|---|---|---|---|---|---|
| | | | | | | odor | pH | conductivity (25° C.) (μS/cm) | odor | pH | conductivity (25° C.) (μS/cm) |
| 6 | 40 | 30 | 3 | 20 | 25 | sweet amine odor | 8.0 | 1.5 | no odor | 7.2 | 0.8 |
| 6 | 40 | 90 | 9 | 60 | 25 | sweet amine odor | 8.1 | 1.5 | no odor | 7.2 | 0.8 |
| 6 | 40 | 120 | 12 | 80 | 25 | sweet amine odor | 8.0 | 1.4 | no odor | 7.2 | 0.8 |
| 6 | 40 | 180 | 18 | 120 | 25 | sweet amine odor | 8.1 | 1.4 | no odor | 7.2 | 0.8 |

From the results shown in Table 1, it is understood that a sweet amine odor in the ion-exchanged purified water can be removed, pH 8.0~8.1 of the ion-exchanged purified water is close to a neutral state such as pH 7.2 and an electric conductivity of the ion-exchanged purified water such as 8.0~8.1 μS/cm (25° C.) is decreased to 08. μS/cm. Therefore, it is understood that a deodorized ion-exchanged purified water having no odor, neutral state and excellent electric conductivity can be obtained according to the first aspect of the invention using the methacrylic acid type H type cation exchange resin.

Experiment 2

An ion-exchanged purified water generated by a dual bed type purified water producing apparatus using a strongly acidic cation exchange resin and a type II strongly basic anion exchange resin (Sybron ASB-2HP) was deodorized by using an acrylic acid type H type weakly acidic exchange cation exchange resin was also performed in the same manner as that of the experiment 1.

(3) Step of deodorizing the ion-exchanged purified water by using the H type weakly acidic cation exchange resin:

150 mL of the H type weakly acidic cation exchange resin treated in the manner mentioned in the step (2) was filled in a resin cylinder in the same manner as that of the experiment 1. Then, the ion-exchanged purified water produced according to the above step (1) was flowed through the resin cylinder. In this case, a water flow rate was set to 6 L/h as is the same as the experiment 1, and a space velocity (SV) with respect to the H type weakly acidic cation exchange resin was set to 40/h. Results of deodorizing the ion-exchanged purified water were shown in the following Table 2.

TABLE 2

Result of deodorizing ion-exchanged purified water by using acrylic acid type H type weakly acidic cation exchange resin (pKa 5.8) (Type II strongly basic anion exchange resin using for ion-exchanged purified water producing)

| Water flow rate (L/h) | Water flow SV (/h) | Water flow (minute) | Water flow amount (L) | Multiple Water flow amount (BV) | Water temperature (°C.) | Ion-exchanged purified water | | | Treatment water | | |
|---|---|---|---|---|---|---|---|---|---|---|---|
| | | | | | | odor | pH | conductivity (25° C.) ($\mu$S/cm) | odor | pH | conductivity (25° C.) ($\mu$S/cm) |
| 6 | 40 | 30 | 6 | 20 | 21 | sweet amine odor | 8.0 | 1.6 | no odor | 7.2 | 0.8 |
| 6 | 40 | 60 | 9 | 40 | 21 | sweet amine odor | 8.1 | 1.4 | no odor | 7.1 | 0.9 |
| 6 | 40 | 90 | 12 | 60 | 21 | sweet amine odor | 8.0 | 1.4 | no odor | 7.2 | 0.8 |

From the results shown in Table 2, it is understood that a sweet amine odor in the ion-exchanged purified water can be removed, pH 8.0~8.1~8.0 of the ion-exchanged purified water is close to a neutral state such as pH 7.2~7.1~7.2 and an electric conductivity of the ion-exchanged purified water such as 1.6~1.4 $\mu$S/cm (25° C.) is decreased to 0.8~0.9~0.8 $\mu$S/cm (25° C.). Therefore, it is understood that a deodorized ion-exchanged purified water having no odor, neutral state and excellent electric conductivity can be obtained according to the first aspect of the invention using the acrylic acid type H type cation exchange resin.

Experiment 3

An ion-exchanged purified water generated by a dual bed type purified water producing apparatus using a strongly acidic cation exchange resin and a type I strongly basic anion exchange resin (Purolite A400E) was deodorized by using an acrylic acid type H type weakly acidic cation exchange resin. An ion-exchanged purified water producing step, an H type weakly acidic cation exchange resin treatment step and a deodorizing step of the ion-exchanged purified water by using the H type weakly acidic cation exchange resin were performed as follows.

(1) Step of producing the ion-exchanged purified water:

This step was performed in the same manner as that of the experiment 1 except that, in the anion exchange resin tower, a copolymer of styrene and divinylbenzene, to which two volume units of a type I strongly basic anion exchange resin having trimethyl ammonium group as a fourth ammonium group was added, was filled. A water quality of the thus produced ion-exchanged purified water was as follows in a substantially stable state. That is to say, a pH was 9.0, an electric conductivity was 1.6 $\mu$S/cm (25° C.), a water temperature was 22° C. and a sweet amine odor was included.

(3) Step of treating the H type weakly acidic cation exchange resin:

Use was made of Purolite 105E (manufactured by Purolite Co., Ltd., USA) which was the weakly acidic cation exchange resin having acrylic acid as an exchange group of the ion-exchange resin. The acidity of Purolite 105E was pKa 3.8. Purolite 105E was treated in the same manner as that of the experiment 1. Moreover, a regeneration of the weakly acidic cation exchange resin was also performed in the same manner as that of the experiment 1.

150 mL of the H type weakly acidic cation exchange resin treated in the same manner mentioned in the step (2) was filled in a resin cylinder in the same manner as that of the experiment 1. Then, the ion-exchanged purified water produced according to the above step (1) was flowed through the resin cylinder. In this case, a water flow rate was set to 6 L/H as is the same as the experiment 1, and a space velocity (SV) with respect to the H type weakly acidic cation exchange resin was set to 40/h. Results of deodorizing the ion-exchanged purified water were shown in the following Table 3.

TABLE 3

Result of deodorizing ion-exchanged purified water by using acrylic
acid type H type weakly acidic cation exchange resin (pKa 5.8)
(Type I strongly basic anion exchange resin using for ion-exchanged
purified water producing)

| Water flow rate (L/h) | Water flow SV (/h) | Water flow (minute) | Water flow amount (L) | Multiple Water flow amount (BV) | Water temperature (°C.) | Ion-exchanged purified water | | | Treatment water | | |
|---|---|---|---|---|---|---|---|---|---|---|---|
| | | | | | | odor | pH | conductivity (25° C.) (μS/cm) | odor | pH | conductivity (25° C.) (μS/cm) |
| 6 | 40 | 30 | 6 | 20 | 22 | sweet amine odor | 9.0 | 1.6 | no odor | 6.7 | 0.7 |
| 6 | 40 | 60 | 9 | 40 | 22 | sweet amine odor | 9.0 | 1.6 | no odor | 6.7 | 0.7 |

From the results shown in Table 3, it is understood that a sweet amine odor in the ion-exchanged purified water can be removed, pH 9.0 of the ion-exchanged purified water is close to a neutral state such as pH 6.7 and an electric conductivity of the ion-exchanged purified water such as 1.6 $\mu$S/cm (25° C.) is decreased to 0.7 $\mu$S/cm (25° C.). Therefore, it is understood that a deodorizing ion-exchanged purified water having no odor, neutral state and excellent electric conductivity can be obtained according to the first aspect of the invention using the acrylic acid type cation exchange resin.

Experiment 4

An ion-exchanged purified water generated by a mixed bed type purified water producing apparatus using a strongly acidic cation exchange resin and a type I strongly basic anion exchange resin (Purolite A400E) was deodorized by using a methacrylic acid type H type weakly acidic cation exchange resin. In the ion-exchanged purified water producing step, an H type weakly acidic cation exchange resin treatment step and a deodorizing step of the ion-exchanged purified water by using the H type weakly acidic cation exchange resin were performed as follows.

(1) Step of producing the ion-exchanged purified water:

The strongly acidic cation exchange resin and the type I strongly basic anion exchange resin to be used were the same kinds as those of the experiment 3. Like the above-described mentioned experiments, raw water was flowed through the mixed bed type purified water producing apparatus in which one volume unit of the strongly acidic cation exchange resin and two volume units of the type I strongly basic anion exchange resin were mixed, so as to obtain the ion-exchanged purified water. A water flow rate was adjusted in such a manner that a space velocity (SV) with respect to the anion exchange resin was 20/h. A water quality of the thus produced ion-purified water was as follows in a substantially stable state. That is to say, a pH was 7.0, an electric conductivity was about 0.07 $\mu$S/cm (25° C.), a water temperature was 25° C. and a little sweet amine odor is included.

(2) Step of treating the H type weakly acidic cation exchange resin:

Use was made of Ionac CC (pKa 5.8) (manufactured by Sybron Co., Ltd., USA) which was the weakly acidic cation exchange resin having methacrylic acid as an exchange group of the ion-exchange resin. Ionac CC was treated in the same manner as that of the experiment 1. Moreover, a regeneration of the weakly acidic cation exchange resin was also performed in the same manner as that of the experiment 1.

(3) Step of deodorizing the ion-exchanged purified water by using the H type weakly acidic cation exchange resin:

150 mL of the H type weakly acidic cation exchange resin treated in the same manner mentioned in the step (2) was filled in a resin cylinder in the same manner as that of the experiment 1. Then, the ion-exchanged purified water produced according to the above step (1) was flowed through the resin cylinder. In this case, a water flow rate was set to 6 L/H like experiment 1, and a space velocity (SV) with respect to the H type weakly acidic cation exchange was set to 40/h. From the results of deodorizing the ion-exchanged purified water, it is understood that a sweet amine odor can be removed, a pH of the ion-exchanged purified water is maintained at pH 7.0 and also an electric conductivity of the ion-exchanged purified water is maintained at about 0.07 $\mu$S/cm (25° C.). Therefore, it is understood that a deodorized ion-exchanged purified water can be obtained according to the first aspect of the invention using the methacrylic acid even for the ion-exchanged purified water obtained by the mixed bed type purified water producing apparatus.

As clearly understood from the above explanations, according to the first aspect of the invention, since the ion-exchanged purified water having the amine odor produced by the dual bed type purified water producing apparatus or the mixed bed type purified water producing apparatus is treated by the weakly acidic cation exchange resin, it is possible to remove the amine odor substance from the ion-exchanged purified water and to deodorize the ion-exchanged purified water.

Moreover, the ion-exchanged purified water produced by using the dual bed type purified water producing apparatus includes a base (alkali) substance due to a salt or its analogous element in the original water as well as the odor substance mentioned above. In the first aspect of the invention, since the ion-exchanged purified water is treated by the hydrogen type weakly acidic cation exchange resin, it is possible to neutralize the base substance. Therefore, it is possible to make a pH value close to the neutral state, to decrease the electric conductivity and to make the purity of the ion-exchanged purified water higher as well as to deodorize the ion-exchanged purified water. Further, since use is made of the hydrogen type weakly acidic cation exchange resin, it is possible to make that regeneration operation easier. In addition, since the mineral aid treatment using hydrochloric acid and sulfonic acid or the thermal caustic treatment were performed, it is possible to sterilize the hydrogen type weakly acidic cation exchange resin, so that the microorganism contamination of the treatment water can be prevented.

Therefore, the method of deodorizing the ion-exchanged purified water according to the first aspect of the invention can be preferably applied to a production of an odor-free purified water for drink production, production of the purified water use for automatic vending machines and production of a standard purified water or mineral water.

Figure 2:
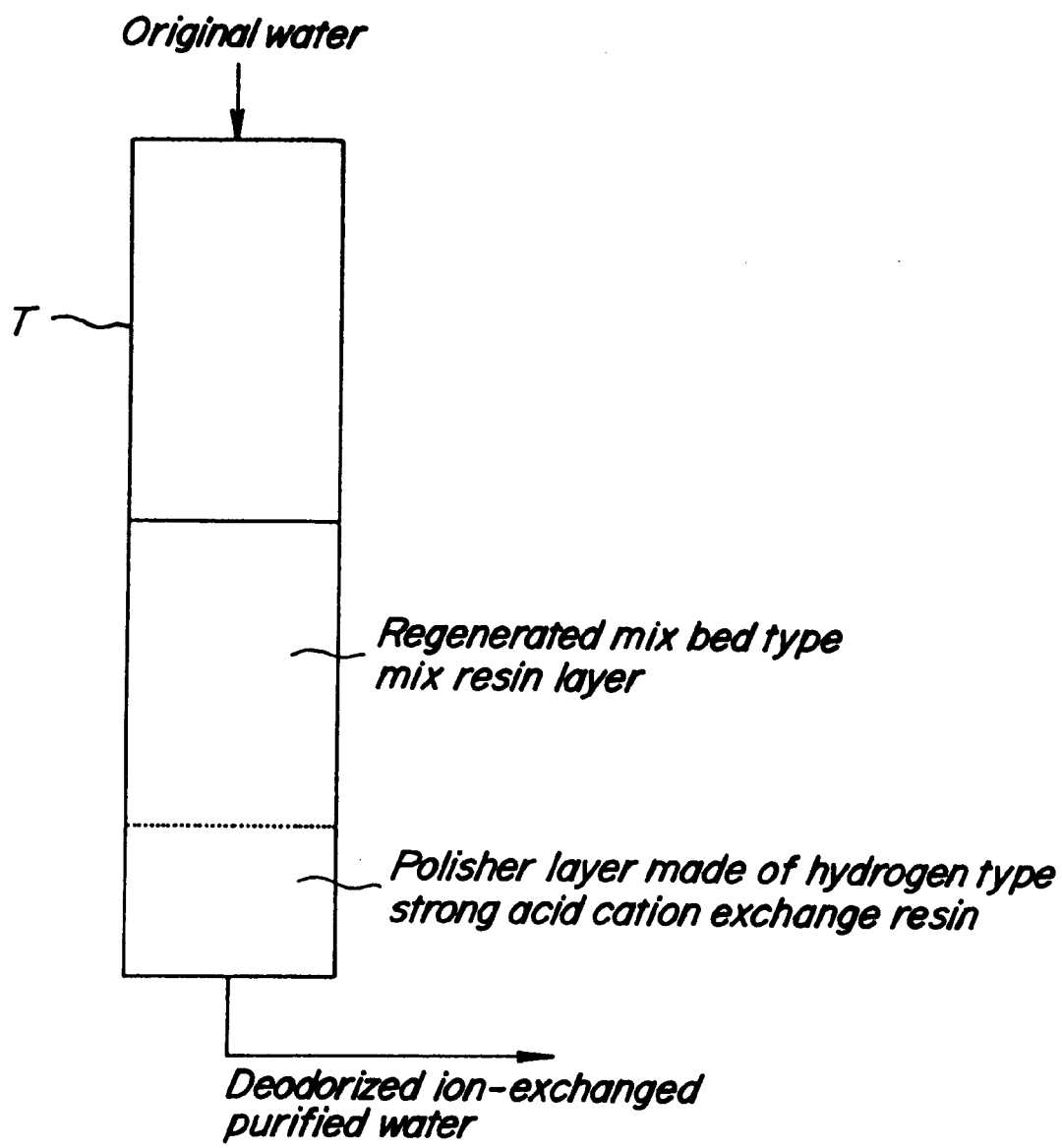
FIG. 2 is a schematic view for explaining one embodiment of a method of deodorizing ion-exchanged purified water according to a second aspect of the invention.

FIG. 2 is a schematic view for explaining embodiment of a method of deodorizing an ion-exchanged purified water according to a second aspect of the invention. In FIG. 2, raw water such as service water is flowed through a regenerated mixed bed type mix resin layer arranged at an upper portion of a single ion-exchange tower T to obtain an ion-exchanged purified water. Then, the ion-exchanged purified water is flowed through a polisher portion made of a hydrogen type strongly acidic cation exchange resin arranged at a lower portion of the ion-exchange tower T to obtain a deodorized ion-exchanged purified water.

Figure 11:
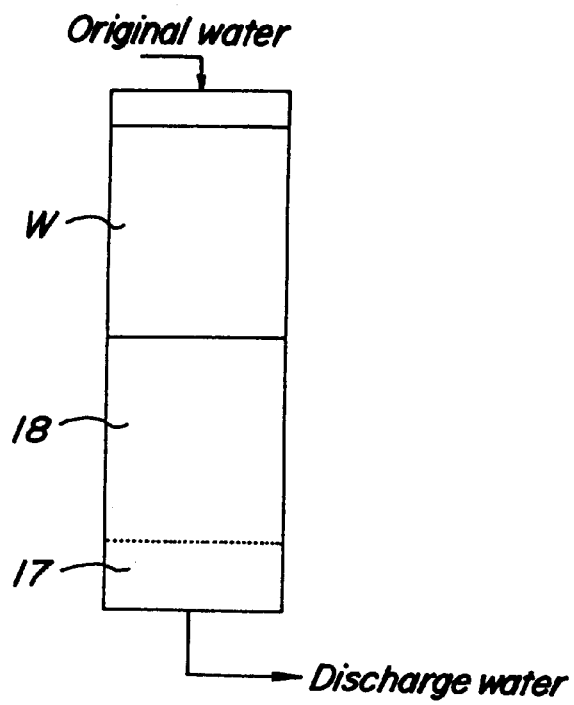
FIG. 11 is a schematic view depicting a layer fix and wash state in the overall mixed system according to the second aspect of the invention.
Figure 12:
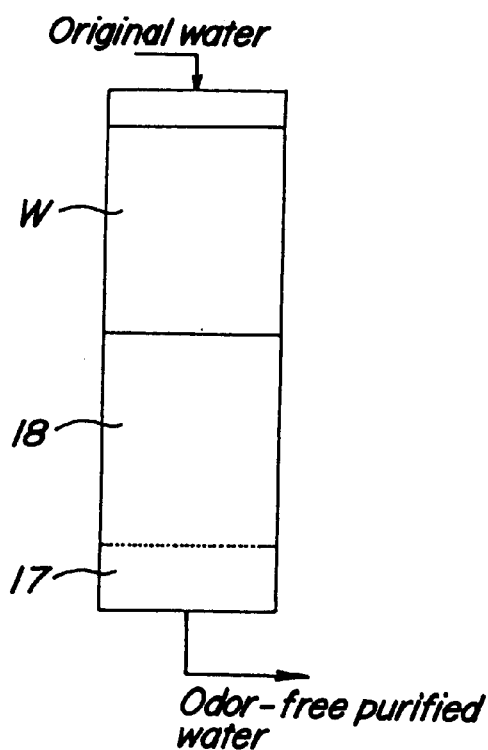
FIG. 12 is a schematic view showing a treatment state in the overall mixed system according to the second aspect of the invention.

FIGS. 3 to 19 are schematic views respectively showing an example of a method of deodorizing a mixed bed type ion-exchange purified water according to the second aspect of the invention. Among them, FIGS. 3 to 9 are schematic views respectively showing a step in a partial mixed system of a strongly acidic cation exchange resin, and FIGS. 10 to 12 are schematic views respectively showing a step in an overall mix system. Moreover, FIGS. 13 to 19 are schematic views respectively showing a step in the overall mixed system using the hydrogen type strongly acidic cation exchange resin having a large sedimentation rate.

Figure 5:
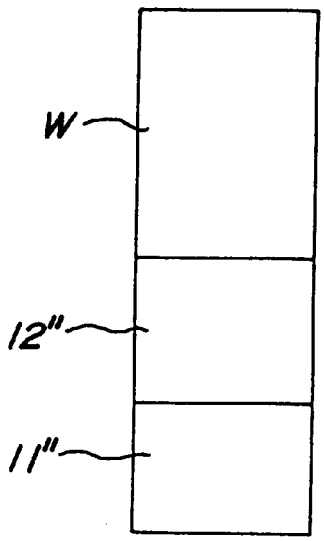
FIG. 5 is a schematic view depicting a resin sedimentation state in the partial mixed system according to the second aspect of the invention.
Figure 6:
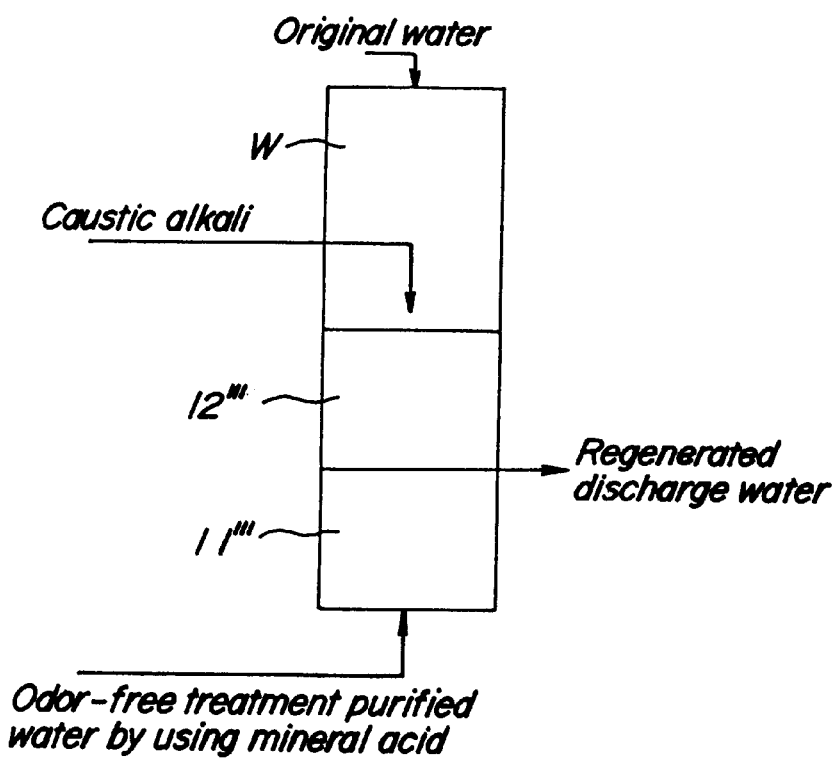
FIG. 6 is a schematic view showing a resin regeneration state in the partial mixed system according to the second aspect of the invention.
Figure 7:
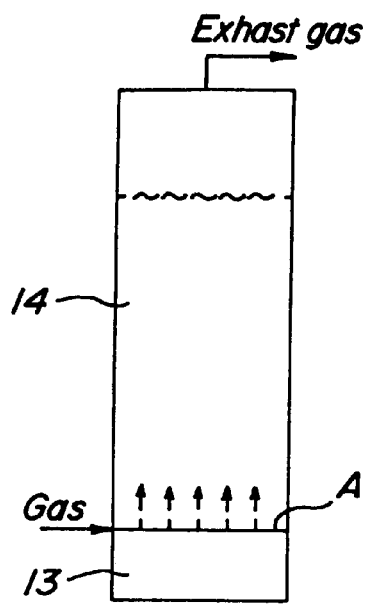
FIG. 7 is a schematic view illustrating a resin partial mixed state in the partial mixed system according to the second aspect of the invention.
Figure 8:
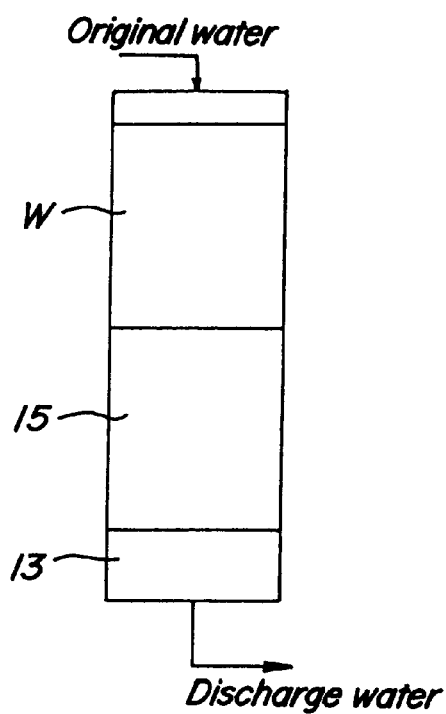
FIG. 8 is a schematic view depicting a layer fix and wash state in the partial mixed system according to the second aspect of the invention.

At first, the partial mixed system of the strongly acidic cation exchange resin and the strongly basic anion exchange resin will be explained. FIG. 3 is a schematic view showing a resin filling state in the ion exchange tower T. In FIG. 3, numeral 11 represents a strongly acidic basic anion exchange resin layer for the mixed bed type. FIG. 4 shows a resin separation state by using a reverse flow prior to a regeneration of the ion-exchange resin. In FIG. 4, numeral 11' is a strongly acidic cation exchange resin slurry, and W is a water layer positioned at the uppermost portion of the ion-exchange tower. FIG. 5 shows a resin sedimentation state after the resin separation by using the reverse flow. In FIG. 5, numeral 11" is a strongly acidic cation exchange resin layer, and numeral 12" is a strongly basic anion exchange resin layer. In FIG. 6, a strongly basic anion exchange resin layer 12''' is regenerated by flowing a caustic alkali solution therethrough in a downward direction and by flowing raw water therethrough so as to wash it. Moreover, a strongly acidic cation exchange resin layer 11''' is regenerated by flowing a mineral acid solution therethrough in an upward direction. FIG. 7 shows a resin partial mixed state of the strongly acidic cation exchange resin and the strongly basic anion exchange resin. In FIG. 7, a gas discharge apparatus A is arranged at a position at which an upper end of a polisher portion 13 made of a hydrogen type strongly acidic cation exchange resin is to be arranged, and a gas such as air or nitrogen is introduced from the gas discharge apparatus and discharged from an upper portion of the ion-exchange tower. In this manner, a mixed resin slurry 14 of a mixed bed type purified water producing portion can be formed by mixing both ion-exchange resins. FIG. 8 shows a layer fix and wash state of the mix resin layer after mixing. In FIG. 8, just after the mixing is finished, the original water is supplied from an upper portion of the ion-exchange resin tower and is discharged from a bottom portion of the ion-exchange resin tower, so that the mixed resin layer is fixed and the entire resin layer is washed. In this manner, the polisher portion 13 made of the regenerated hydrogen type strongly acidic cation exchange resin is arranged at a lowermost portion of the ion-exchange resin tower, and a mixed bed type purified water producing portion 15 having a regenerated mixed resin layer is formed on the polisher portion 13. FIG. 9 shows a treatment state. In FIG. 9, the original water is supplied from the upper portion of the ion-exchange tower, and an odor-free purified water is generated from the lowermost portion of the ion-exchange tower. In this case, the strongly acidic cation exchange resin layer 1 may be separated beforehand by using a net or the like into the mixed bed type purified water producing portion 15 and the polisher portion 13 at a position of the gas discharge apparatus A.

Then, the overall mixed system will be explained. FIG. 10 shows a resin overall mixed state. In FIG. 10, a gas such as air or nitrogen is introduced from a gas discharge apparatus A' for an overall mixing arranged at a lowermost position of the ion-exchange tower and is discharged from an upper portion of the ion-exchange tower. In this manner, all the ion-exchange resins are mixed to form a mixed resin slurry 16. FIG. 11 shows a layer fix and wash state after the overall mixing. In FIG. 11, a gas mixing operation is stopped by stopping the gas introduction, and a polisher portion 17 made of the hydrogen type strongly acidic cation exchange resin is formed at a bottom portion of the ion-exchange tower. After that, the raw water is immediately supplied from the upper portion of the ion-exchange tower and is discharged from the lowermost portion of the ion-exchange tower so as to fix and wash a mixed bed type purified water producing portion 18 having the regenerated mixed resin layer. FIG. 12 shows a treatment state. In FIG. 12, the raw water is supplied from the upper portion of the ion-exchange tower, and the odor-free purified water is generated from the lowermost portion of the ion-exchange tower.

Figure 13:
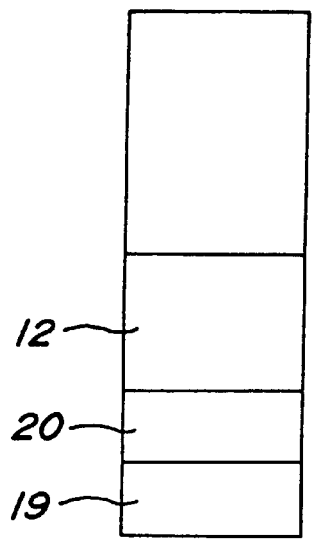
FIG. 13 is a schematic view illustrating a resin filling state in an overall mixed system using a hydrogen type strongly acidic cation exchange resin having a large sedimentation rate according to the second aspect of the invention.
Figure 14:
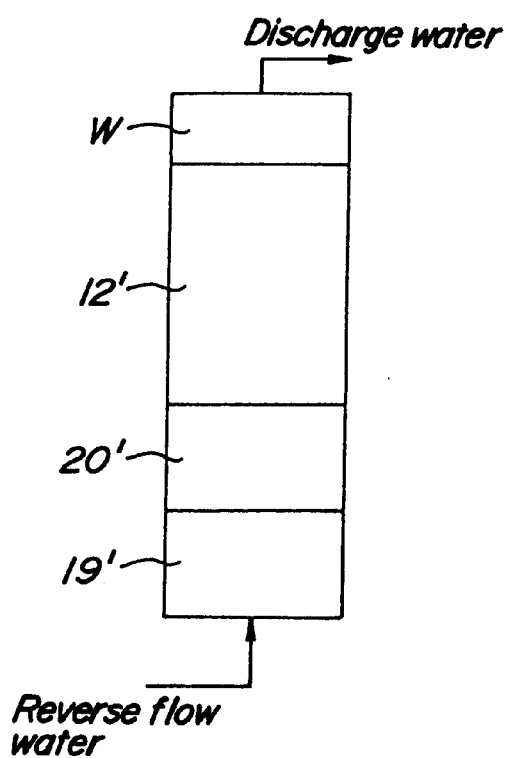
FIG. 14 is a schematic view depicting a resin separation state by using a reverse flow in the overall mixed system using the hydrogen type strongly acidic cation exchange resin having a large sedimentation rate according to the second aspect of the invention.
Figure 15:
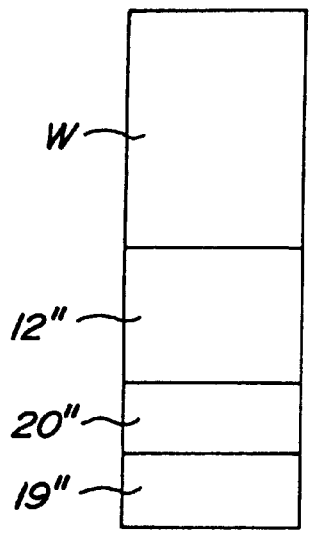
FIG. 15 is a schematic view showing a resin sedimentation state in the overall mixed system using the hydrogen type strongly acidic cation exchange resin having a large sedimentation rate according to the second aspect of the invention.
Figure 16:
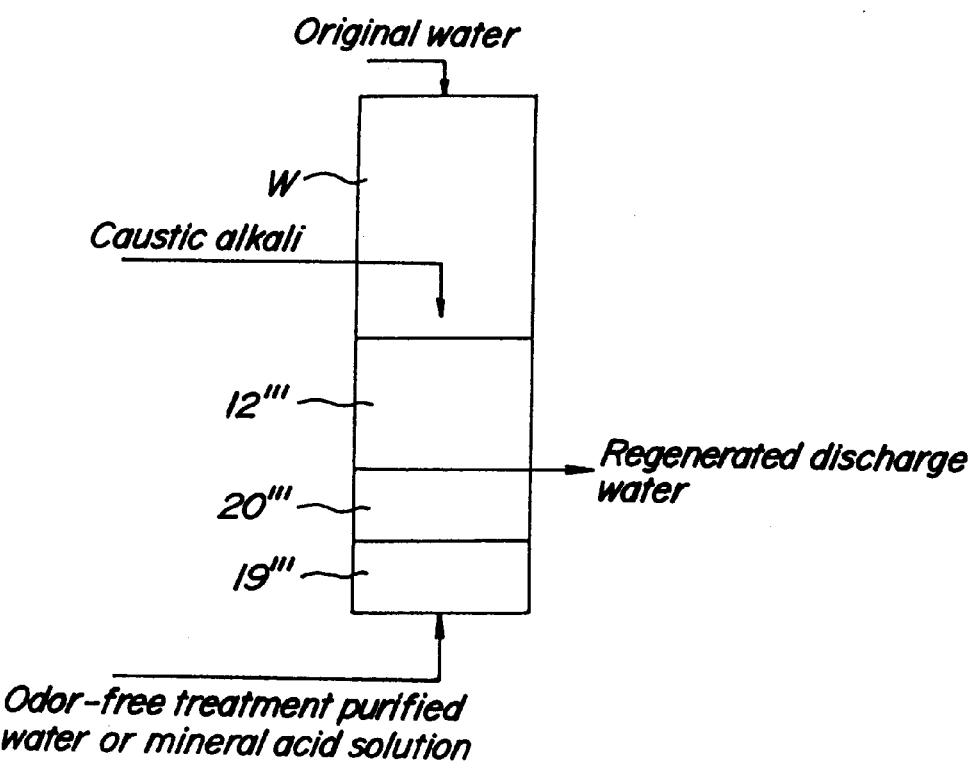
FIG. 16 is a schematic view illustrating a resin regeneration state in the overall mixed system using the hydrogen type strongly acidic cation exchange resin having a large sedimentation rate according to the second aspect of the invention.
Figure 19:
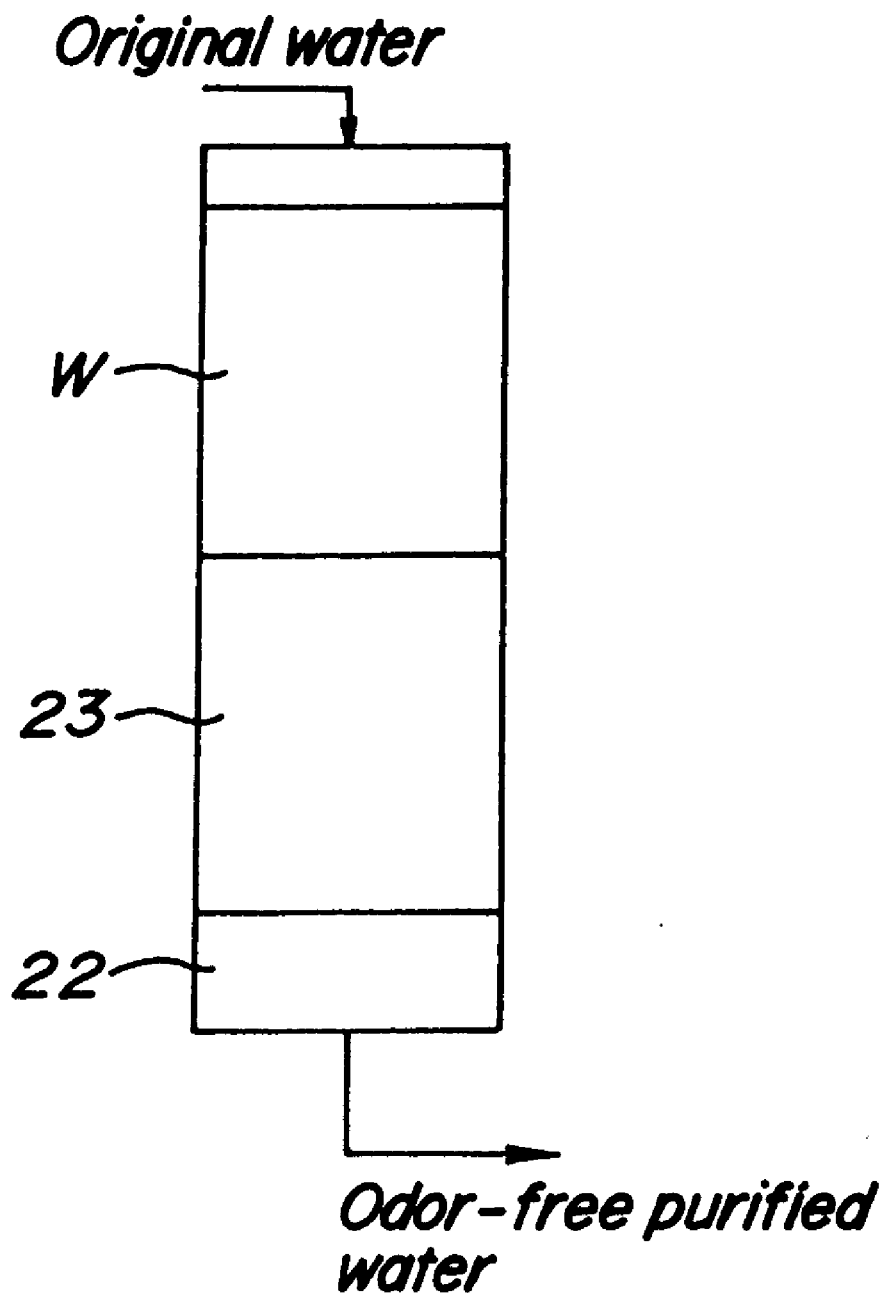
FIG. 19 is a schematic view illustrating a treatment state in the overall mixed system using the hydrogen type strongly acidic cation exchange resin having a large sedimentation rate according to the second aspect of the invention.

Then, the overall mixed system, in which the strongly acidic cation exchange resin having a sedimentation rate larger than that of the strongly acidic cation exchange resin in the mixed bed type purified water producing portion is used as a resin of the polisher portion, will be exchanged. FIG. 13 shows a resin filling state in the ion-exchanged tower. In FIG. 13, numeral 19 is a strongly acidic cation exchange resin layer having a larger sedimentation rate which constructs a polisher portion, numeral 20 is a strongly acidic cation exchange resin layer in the mixed bed type purified water producing portion, and numeral 12 is the strongly basic anion exchange resin layer mentioned above. In FIG. 14, numeral 19' is a slurry for the polisher portion made of the strongly acidic cation exchange resin having a larger sedimentation rate made of the strongly acidic cation exchange resin having a larger sedimentation rate, numeral 20" is a strongly acidic cation exchange resin layer of the mixed bed type purified water producing portion, and numeral 12" is a strongly basic anion exchange resin layer of the mixed bed type purified water producing portion as mentioned above. FIG. 16 is a regeneration operation of the ion-exchange resin layer. In FIG. 16, a strongly basic anion in the case of flowing the reverse flow water, numeral 20' is a strongly acidic cation exchange resin slurry of the mixed bed type purified water portion in the case of flowing the reverse flow water, and numeral 12' is a strongly basic anion exchange resin slurry in the case of flowing the reverse flow water as mentioned above. FIG. 15 shows a resin sedimentation state after the resin separation state by using the reverse flow. In FIG. 15, numeral 19" is a polisher portion exchange layer 12''' is regenerated into a hydroxyl group type by flowing a caustic alkali solution therethrough in a downward direction, supplying the raw water from the upper portion of the ion-exchange tower so as to perform a washing, and discharging the washed original water from the lower portion thereof. Moreover, a strongly acidic cation exchange resin layer 20''' of the mixed bed type purified water producing portion and a strongly acidic cation exchange resin layer 19''' having a large sedimentation rate of the polisher portion are regenerated into a hydrogen group type by flowing a mineral acid solution from the lowermost portion of the ion-exchange tower in an upper direction, flowing a purified water or an odor-free treatment purified water from the lowermost portion of the ion-exchange tower in an upper direction so as to perform a washing, and discharging the washed water from the upper portion of the layer 20'''. FIG. 17 shows an overall mixed state of all the ion-exchange resins. In FIG. 17, a gas such as air or nitrogen is introduced from a gas discharging apparatus A' for the overall mixing arranged at the lowermost portion of the ion-exchange tower in an upper direction, and is discharged from the upper portion of the ion-exchange tower so as to mix all the ion-exchange resins, so that a mixed resin slurry 21 is formed. FIG. 18 shows a resin layer fix and sedimentation state after the mixing. In FIG. 18, the gas mixing operation is stopped by stopping the gas introduction, and a polisher portion 22 made of the hydrogen type strongly acidic cation exchange resin having a large sedimentation rate is formed at a bottom portion of the ion-exchange tower. After that, the raw water is immediately supplied from the upper portion of the ion-exchange tower and is discharged from the lowermost portion of the ion-exchange tower so as to fix and wash a regenerated mixed bed type purified water producing portion 23. The formation of the polisher portion 22 can be performed swiftly and effectively as compared with the formation of the polisher portion having a normal sedimentation rate shown in FIG. 11. After that, the raw water is immediately supplied from the upper portion of the ion-exchange tower and is discharged from the lowermost portion of the ion-exchange tower, so that the regenerated mixed bed type purified water producing portion 23 is fixed and washed. FIG. 19 shows a treatment state. In FIG. 19, the original water is supplied from the upper portion of the ion-exchange tower and the odor-free purified water is generated from the lowermost portion of the ion-exchange tower.

Hereinafter, technical features used in the second aspect of the invention will be explained.

(1) Ion-exchanged purified water:

The ion-exchanged purified water means a purified water obtained by passing raw water through the mixed bed type purified water producing apparatus in which a hydrogen type strongly acidic cation exchange resin and a hydroxyl group type strongly basic anion exchange resin are mixed.

The ion-exchanged purified water generated from the mixed bed type purified water producing portion shows a high purity and has an electric conductivity of about smaller than 1 $\mu$S/cm and a pH value of about 7. Moreover, the ion-exchanged purified water generated from the mixed bed type purified water producing apparatus includes also a dissolved substance of the strongly basic anion exchange resin and an amine compound such as trimethylamine and dimethyl ethanol amine which is generated by decomposing a fourth ammonia radical, but most of the dissolved substance and the amine compound are absorbed by the adjacent hydrogen type strongly acidic cation exchange resin. However, since the dissolved substance and the amine compound having an amine odor, which exist in the lower portion of the mixed bed tower, do not have much time and opportunity for being in contact with the adjacent strongly acidic cation exchange resin, a large amount of the amine odor substance remains in the treatment water.

(2) Strongly acidic cation exchange resin and strongly basic anion exchange resin used in the mixed bed type purified water producing portion:

As the strongly acidic cation exchange resin and the strongly basic anion exchange resin used in the mixed bed type purified water producing apparatus, all the known ion-exchange resins can be used.

(3) Strongly acidic cation exchange resin for polishing:

As the strongly acidic cation exchange resin for polishing, all the known strongly acidic cation exchange resins of the mixed bed type purified water producing portion can be used. Moreover, if a sedimentation rate of a hydrogen type strongly acidic cation exchange resin particle used in the polishing portion is larger than that of the hydrogen type strongly acidic cation exchange resin particle in the overall mixed system of the ion-exchange resin, a resin layer fix operation can be performed swiftly and effectively and thus it is preferred. In order to select the ion-exchange resin particle having a large sedimentation rate, it is necessary to use a resin particle having a spherical shape and a larger diameter. Moreover, if use is made of copolymer of styrene and divinylbenzene (DVB) as the resin particle, it is necessary to use the copolymer having a large cross-linking rate (DVB%). Moreover, the ion-exchange resin having all the properties mentioned above shows a larger sedimentation rate. One embodiment of the strongly acidic cation exchange resin having a large sedimentation is shown in Table 4.

TABLE 4

Selection example of strongly acidic cation
exchange resin polisher having large sedimentaton
rate (all cation exchange resins are made by
Sybron Chemical Co., Ltd., all data are measured
in wet state)

| Kind of strongly acidic cation exchanged resin | Particle size (ASTM mesh) | Particle diameter (mm) | Cross-linking rate DVB (%) | Density (g/cc) |
|---|---|---|---|---|
| ① Ionac C-249 | 16~40 | −1.18 + 0.425 | 8 | about 1.26 |
| ② Ionac Impact CS-399C | 16~40 | −1.18 + 0.425 | 10 | about 1.32 |
| ③ mesh through resins described above | 16~18 | −1.18 + 1.00 | 10 | about 1.32 |

In Table 4, numeral 1 shows properties of the strongly acidic cation exchange resin used in the mixed bed type purified water producing portion. Moreover, numeral 2 shows one embodiment of the resin which makes the sedimentation rate larger by increasing DVB of the resin from 8% to 10% and by increasing a true density from about 1.26 to 1.32. Further, a numeral 3 shows one embodiment of the resin which makes the sedimentation rate larger by passing the resin particles through a mesh.

Moreover, the hydrogen type strongly acidic cation exchange resin of the polisher portion having a large sedimentation rate may be used together with the strongly acidic cation exchange resin of the mixed bed type purified water producing portion in the partial mixed type shown in FIGS. 3 to 9.

(4) Sterilization of microorganisms by the regeneration operation of the ion-exchange resin:

Every time the regeneration operation is performed the strongly basic anion exchange resin is regenerated by using a caustic alkali solution having a temperature of a normal temperature ~60° C., and the strongly acidic cation exchange resin is regenerated by a mineral acid solution having a normal temperature. Moreover, if the amine odor substance is not sufficiently removed from the strongly acidic cation exchange resin the mixed bed type purified water producing portion or the polisher portion, a property recovery operation of the strongly acidic cation exchange resin is performed by flowing a hot caustic alkali solution having a temperature of 30~60° C. or a hot water therethrough. Therefore, since the strongly basic anion exchange resin and the strongly acidic cation exchange are sterilized, it is possible to prevent a microorganism contamination of the odor-free treatment water generated from the ion-exchange purified water.

Hereinafter, an actual embodiment according to the second aspect of the invention will be explained.

Experiment 5

A strongly acidic cation exchange resin for mixed bed type purified water producing portion and a polisher portion and a type I strongly basic anion exchange resin were filled in an ion-exchange tower. Then, the resin separation step by the reverse flow, the resin sedimentation step, the resin regeneration step, the resin partial mix step and the layer fix and wash step mentioned above were performed successively to obtain the system having a mixed resin layer of the mixed bed type purified water producing portion arranged at its upper portion and a polisher portion of the hydrogen type strongly acid cation exchange resin arranged at its lower portion. Then, the ion-exchanged purified water was deodorized by using the system mentioned above. In this case, the raw water to be used was service water. As water for the washing step of the mixed resin layer and the proceeding steps after the washing step, use was made of an odor-free raw water obtained by deodorizing the original water by using an active carbon.

The raw water was supplied in the ion-exchange tower having an inner diameter of 50 mm and a height of 2,000 mm. The water depth was about 1 m. Then, Ionac C-249 (manufactured by Sybron Chemical Co., Ltd., USA) was filled in the ion-exchange tower to construct a lower layer of 1.00L (layer thickness of 51.0 cm) as the strongly acidic cation exchange resin. Moreover, Purolite A-400E (manufactured by Purolite Co., Ltd., USA) was filled in the ion-exchange tower to construct an upper layer of 1.00L (layer thickness of 51.0 cm) as the type I strongly basic anion exchange resin. In this case, a total amount of the resin layers was 2.00L (total layer thickness of 102.0 cm). A measurement of the resin filling amount was performed by repeating the resin separation by the reverse flow and the resin natural sedimentation according to the standard method.

(2) Step of performing the resin separation by using the reverse flow and the resin sedimentation:

In order to separate the strongly acidic cation exchange resin and the strongly basic anion exchange resin, the raw water was supplied from the lowermost portion of the ion-exchange tower for 20 minutes in such a manner that a resin layer expansion rate became about 60%. Then, the original water supply was stopped so as to perform the resin natural sedimentation. Finally, the Purolite A-400E layer was formed at the upper portion, and the Ionac C-249 layer was formed at the lower portion.

(3) Step of performing the resin regeneration:

The resin regeneration of the mixed bed type purified water producing portion was performed according to the normal regeneration method. The upper Purolite A-400E layer was regenerated by flowing a 5% NaOH solution having a temperature of 50° C. therethrough in a downward direction at SV: 3/h for 1.5 hours, flowing the raw water having a temperature of 50° C. therethrough at SV: 3/h for 20 minutes to replace the NaOH solution, and flowing the raw water having a temperature of 50° C. therethrough at SV: 20/h for 90 minutes to perform the washing operation. The lower Ionac C-249 layer was regenerated by flowing a 5% HCl solution having a normal temperature therethrough in an upward direction at SV: 3/h for 1 hour, flowing the odor-free treatment water having a normal temperature therethrough at SV: 3/h for 20 minutes to replace the HCl solution, and flowing the odor-free treatment successively therethrough at SV: 20/h 3 for 60 minutes to perform the washing operation. A water used for the regeneration of the ion-exchange resins were discharged out of the ion-exchange tower via a collector arranged at a boundary surface between the ion-exchange layers.

(4) Step of performing the partial mix:

A water level was maintained at about 30 cm on the ion-exchange resin layer. Compressed air was introduced from the gas discharge apparatus for the partial mix arranged at about 27 cm upper position from the lowermost portion of the lower Ionac C-249 layer. Then, the introduced compressed air was discharged from the upper portion of the ion-exchange tower for about 3 minutes to mix a part of the Ionac C-249 layer arranged at about 27 cm upper position or more and the Purolite A-400E layer arranged thereon. In this case, a part of the Ionac C-249 layer under the gas discharge apparatus was not mixed and became the polisher portion of the hydrogen type strongly acidic cation exchange resin.

(5) Step of performing the layer fix and wash:

The mix operation mentioned above was stopped, and the odor-free original water was supplied immediately from the upper portion of the ion-exchange tower at a flow rate of 40 L/h while the water is discharged from the lowermost portion of the ion-exchange tower, so that the mixed resin layer of the mixed bed type purified water producing portion was fixed. Successively, the odor-free original water was supplied at the same flow rate to wash the mixed resin layer of the mixed bed type purified and the polisher portion, so that an electric conductivity of the discharge water from the lowermost portion of the ion-exchange tower was not more than 0.5 $\mu$S/cm (25° C.). This step took about 30 minutes.

(6) Step of producing the odor-free ion-exchanged purified water:

The odor-free original water was supplied from the upper portion of the ion-exchange tower at a flow rate of 40 L/h (SV: 27/hr with respect to the mixed bed type purified water producing portion, SV: 80/h with respect to the polished layer). The odor-free ion-exchanged purified water was obtained from the lowermost portion of the ion-exchange tower as the treatment water. The treatment results of the ion-exchanged purified water and the odor-free ion-exchanged purified water are shown in the following Table 5.

(25° C.) and is maintained in a stable state. Therefore, it is understood that the odor-free ion-exchanged purified water having a good quality can be easily and stably produced by using the single ion-exchange tower.

Experiment 6

Experiment 6 was performed for substantially the same system as that of experiment 5 except that use was made of a type II strongly basic anion exchange resin used in the mixed bed type purified water producing portion.

(1) Step of filling the ion-exchange resin:

The same ion-exchange tower as that of experiment 5 was used. As the type II strong base anion exchange resin, Ionac ASB-2HP (manufactured by Sybron Chemical Co., Ltd., USA) was used. As the strongly acidic cation exchange resin, Ionac C-249, which was the same as that of Experiment 5, was used. The filling amount and the filling method were the same as those of experiment 5.

(2) Step of performing the resin separation by using the reverse flow and the resin sedimentation:

According to the same manner as that of experiment 5, the strongly basic anion exchange resin and the strongly acidic cation exchange resin were separated by the reverse flow. Then, the Ionac ASB-2HP layer was arranged at an upper portion of the ion-exchange tower, and the Ionac C-249 layer was arranged at a lower portion of the ion-exchange tower.

(3) Step of performing the resin regeneration:

The resin regeneration method and the resin regeneration apparatus were substantially the same as those of experiment 5. Different points were as follows. The Ionac ASB-2HP layer was regenerated by flowing a 5% NaOH solution having a temperature of 35° C. therethrough at SV: 3/h for 1.0 hour, flowing the raw water having a temperature of 35° C. therethrough at SV: 3/h for 20 minutes to replace the NaOH solution, and flowing the raw water having a temperature of 35° C. therethrough at SV: 20/h for 90 minutes.

TABLE 5

Results of deodorizing ion-exchanged purified water by using hydrogen type strongly acidic cation exchange resin polisher in partial mixed system (Type I strongly basic anion exchange resin using for ion-exchanged purified water producing)

| Water flow | | Sample pick-up time after water flow start (min.) | Water flow | | Water tempera-ture (°C.) | Ion-exchanged water | | Polisher treatment water | |
|---|---|---|---|---|---|---|---|---|---|
| rate | | | amount | | | | conductivity | | conductivity |
| (L/h) | polisher SV(/h) | | (L) | polisher (BV) | | odor | (25° C.) ($\mu$S/cm) | odor | (25° C.) ($\mu$S/cm) |
| 40 | 80 | 90 | 60 | 120 | 20 | fish-like amine odor | 0.17 | no odor | 0.15 |
| 40 | 80 | 120 | 80 | 160 | 20 | fish-like amine odor | 0.18 | no odor | 0.15 |
| 40 | 80 | 150 | 100 | 200 | 20 | fish-like amine odor | 0.18 | no odor | 0.15 |

From the results shown in Table 5, it is understood that a fish-like amine odor in the ion-exchanged purified water generated by using the type I strongly basic anion exchange resin can be removed by the treatment using the polisher portion made of the hydrogen type strongly acidic cation exchange resin. Moreover, it is understood that an electric conductivity of the ion-exchanged purified water is decreased from 0.17~0.18 $\mu$S/cm (25° C.) to 0.15 $\mu$S/cm (4) Step of performing the partial mix:

The partial mix step was performed in the same manner as that of experiment 5 except that the Ionac ASB-2HP layer was arranged at the upper portion instead of the Purolite A-400E layer.

(5) Step of performing the layer fix and wash:

The layer fix and wash step was performed in the same manner as that of experiment 5.

(6) Step of producing the odor-free ion-exchanged purified water:

The odor-free ion-exchanged purified water producing step was performed in the same manner as that of experiment 5. The results are shown in the following Table 6.

TABLE 6

Results of deodorizing ion-exchanged purified water by using hydrogen type strongly acidic cation exchange resin polisher in partial mixed system (Type II strongly basic anion exchange resin using for ion-exchanged purified water producing)

| Water flow rate | Sample pick-up time after water flow | Water flow amount | | Water tempera-ture | Ion-exchanged water | | Polisher treatment water | |
|---|---|---|---|---|---|---|---|---|
| (L/h) | polisher SV(/h) | start (min.) | (L) | polisher (BV) | (°C.) | odor | conductivity (25° C.) ($\mu$S/cm) | odor | conductivity (25° C.) ($\mu$S/cm) |
| 40 | 80 | 90 | 60 | 120 | 20 | sweet amine odor | 0.22 | no odor | 0.20 |
| 40 | 80 | 120 | 80 | 160 | 20 | sweet amine odor | 0.22 | no odor | 0.20 |
| 40 | 80 | 150 | 100 | 200 | 20 | sweet amine odor | 0.23 | no odor | 0.20 |

From the results in Table 6, it is understood that a sweet amine odor in the ion-exchange purified water generated by using the II type strongly basic anion exchange resin can be removed by the treatment using the hydrogen type strongly acidic cation exchange resin. Moreover, it is understood that an electric conductivity of the ion-exchanged purified water is decreased from 0.22~0.23 $\mu$S/cm (25° C.) to 0.20 $\mu$S/cm (25° C.) and is maintained in a stable state. Therefore, it is understood that the odor-free ion-exchanged purified water having a good quality can be easily and stably produced by using the single ion-exchange tower.

Experiment 7

Experiment 7 was performed from substantially the same system as that of experiment 6 except that use was made of the mixed bed type ion-exchange purified water producing portion of an overall mixed type instead of the partial mixed type. The operations other than the overall mixing step and the layer fix and wash step after that were the same as those of the experiment 6. Therefore, explanations of the same steps (1)~(3) are omitted here.

(4) Step of performing the overall mix:

A water level was maintained at about 60 cm on the ion-exchange resin layer. Compressed air was introduced from the gas discharge apparatus for the overall mix arranged at the lowermost portion of the ion-exchange resin layer. Then, the introduced compressed air was discharged from the upper portion of the ion-exchange tower for about 3 minutes to mix all of the ion-exchange resin into a slurry state.

(5) Step of performing the layer fix and wash:

The mix operation mentioned above was stopped, and the polisher portion made of the hydrogen type strongly acidic cation exchange resin having a thickness of about 25~27 cm was formed at the lower portion of the ion-exchange tower by utilizing a natural sedimentation. Just after that, the odor-fres raw water was supplied from the upper portion of the ion-exchange tower at a flow rate of 40 L/h while the water was discharged from the lowermost portion of the ion-exchange tower, so that the mixed resin layer of the mixed bed type purified water producing portion was fixed. Successively, the odor-free raw water was supplied at the same flow rate to wash the mixed resin layer of the mixed bed type purified water producing portion and the polisher portion, so that an electric conductivity of the discharge water from the lowermost portion of the ion-exchange tower was not more than 1 $\mu$S/cm (25° C.). This step took about 30 minutes.

(6) Step of producing the odor-free ion-exchanged purified water:

The odor-free ion-exchanged purified water producing step was performed in the same manner as that of experiment 6. The results are shown in the following table 7.

TABLE 7

Results of deodorizing ion-exchanged purified water by using hydrogen type strongly acidic cation exchange resin polisher in partial mixed system (Type II strongly basic anion exchange resin using for ion-exchanged purified water producing)

| Water flow rate polisher (L/h) SV(/h) | Sample pick-up time after water flow start (min.) | Water flow amount (L) | polisher (BV) | Water tempera-ture (°C.) | Ion-exchanged water odor | Ion-exchanged water conductivity (25° C.) (μS/cm) | Polisher treatment water odor | Polisher treatment water conductivity (25° C.) (μS/cm) |
|---|---|---|---|---|---|---|---|---|
| 40  80 | 90 | 60 | 120 | 20 | sweet amine odor | 0.49 | no odor | 0.44 |
| 40  80 | 120 | 80 | 160 | 20 | sweet amine odor | 0.49 | no odor | 0.44 |
| 40  80 | 150 | 100 | 200 | 20 | sweet amine odor | 0.50 | no odor | 0.44 |

From the results shown in Table 7, it is understood that a sweet amine odor in the ion-exchanged purified water generated by using the type II strong base anion exchange resin can be removed by the treatment using the hydrogen type strongly acidic cation exchange resin also in the overall mixed system. Moreover, it is understood that an electric conductivity of the ion-exchanged purified water is decreased from 0.49~0.50 μS/cm (25° C.) to 0.44 μS/cm (25° C.) and is maintained in a stable state. Therefore, it is understood that the odor-free ion-exchanged purified water having a good quality can be easily and stably produced by using the single ion-exchange tower.

Experiment 8

Experiment 8 was performed for substantially the same system as that of experiment 7 except that use was made of the hydrogen type strongly acidic cation exchange resin as the polisher portion. The operations were the same as those of experiment 7.

(1) Step of filling the ion-exchange resin:

The same ion-exchange tower as that of experiment 7 was used. As for the mixed bed type purified water producing portion, use was made of 1.00L of Ionac ASB-2HP as the type II strongly basic anion exchange resin and 0.50L of Ionac C-249 as the strongly acidic cation exchange resin as is the same as experiment 7. As for the strongly acidic cation exchange resin for the polisher portion, use was made of the mesh-through Ionac Impact CS-399C having a large sedimentation rate. Properties of Ionac C-249 relating to the sedimentation rate were that a particle size was 16~40 ASTM mesh (particle −1.18 mm+0.428 MM), a cross-linking rate was DVB: 8% and a true density was about 1.26. On the other hand, properties of the mesh-through Ionac Impact CS-399C were that, as shown in Table 4 as a numeral 3, a particle size was 16~18 ASTM mesh (particle −1.18 mm+1.00 mm), a cross-linking rate was DVB: 10% and a true density was about 1.32. As clearly understood from the above, the mesh-through Ionac Impact CS-399C had larger particle size and larger true density than those of the Ionac C-249, and thus had a large sedimentation rate. The resin filling operation was the same as that of experiment 6.

(2) Step of performing the resin separation by using the reverse flow and the resin sedimentation:

According to the same manner as that of experiment 7, three kinds of the ion-exchange resins were separated as a slurry by the reverse flow for 20 minutes in such a manner that a total resin layer expansion rate became about 60%. Then, the raw water supply was stopped so as to perform the resin natural sedimentation. Finally, the Ionac ASB-2HP layer was formed at the upper portion, the Ionac C-249 layer was formed at the middle portion and the mesh-through Ionac Impact CS-399C layer was formed at the lower portion.

(3) Step of performing the resin regeneration:

The resin regeneration step was performed in the same manner as that of experiment 7.

(4) Step of performing the overall mix:

The overall mix step was performed in the same manner as that of experiment 7.

(5) Step of performing the layer fix and wash:

The layer fix and wash was performed in the same manner as that of experiment 7. In this case, since the sedimentation and fix of the polisher portion can be performed swiftly, a re-separation of the mix resin layer of the mixed bed type purified water producing portion was small, and it was possible to perform the layer fix operation in a good mix condition.

(6) Step of producing the odor-free ion-exchanged purified water:

The odor-free ion-exchanged purified water producing step was performed in the same manner as that of experiment 7. The results are shown in the following Table 8.

TABLE 8

Results of deodorizing ion-exchanged purified water by using
hydrogen type strongly acidic cation exchange resin polisher in
partial mixed system (Type II strongly basic anion exchange resin
using for ion-exchanged purified water producing)

| Water flow rate (L/h) | Sample pick-up time after water flow start (min.) | Water flow amount (L) | Water (polisher BV) | Water tempera-ture (°C) | Ion-exchanged water odor | Ion-exchanged water conductivity (25° C.) ($\mu$S/cm) | Polisher treatment water odor | Polisher treatment water conductivity (25° C.) ($\mu$S/cm) |
|---|---|---|---|---|---|---|---|---|
| 40 | 80 | 90 | 60 | 120 | 20 | sweet amine odor | 0.45 | no odor | 0.41 |
| 40 | 80 | 120 | 80 | 160 | 20 | sweet amine odor | 0.45 | no odor | 0.41 |
| 40 | 80 | 150 | 100 | 200 | 20 | sweet amine odor | 0.45 | no odor | 0.41 |

From the results shown in Table 8, it is understood that a sweet amine odor in the ion-exchanged purified water generated by using the type II strongly basic anion exchanged resin can be removed by the treatment using the hydrogen type strongly acidic cation exchange resin having a large sedimentation rate as the polisher portion also in the overall mixed system. Moreover, it is understood that an electric conductivity of the ion-exchanged purified water is decreased from 0.45 $\mu$S/cm (25° C.) to 0.41 $\mu$S/cm (25° C.) and is maintained in a stable state. Therefore, it is understood that the odor-free ion-exchanged purified water had a better quality than that of experiment 7 using no polisher portion having a large sedimentation rate.

As clearly understood from the above, according to the second aspect of the invention, since the hydrogen type strongly acidic cation exchange resin layer for the polishing is arranged at the lower portion of the mixed bed type purified water producing portion including the mixed resin layer having the hydrogen type strongly acidic cation exchange resin and the hydroxyl group type strongly basic anion exchange resin, the amine odor substance in the ion-exchange purified water generated from the mixed bed type resin layer can be removed, and the odor-free ion-exchanged purified water can be obtained.

Moreover, since the hydrogen type strongly acidic cation exchange resin layer used for the polishing is regenerated by the mineral acid solution every time the strongly acidic cation exchange resin consisting of the mixed resin layer is regenerated by the mineral acid solution, it is possible to sterilize the strongly acidic cation exchange resin layer as well as the sufficient regeneration operation, and thus the microorganism contamination of the treatment water can be preferably prevented.

What is claimed is:

1. A method of deodorizing water, comprising:

flowing raw untreated water through a mixed bed water purifying apparatus having a mixed resin layer comprising a hydrogen type strongly acidic cation exchange resin and a hydroxyl group type strongly basic anion exchange resin to provide ion-exchanged purified water;

separating said mixed resin layer into an upper strongly basic anion exchange resin layer and a lower strongly acidic cation exchange resin layer by flowing raw untreated water therethrough; and flowing the ion-exchanged purified water through a polishing portion of the mixed bed water purifying apparatus, said polishing portion having a hydrogen type strongly acidic cation exchange resin comprising a strongly acidic cation exchange resin having a larger sedimentation rate than that of said strongly acidic cation exchange resin of said mixed resin layer and arranged at a lower portion of the mixed resin layer of the mixed bed water purifying apparatus, so that an odor substance in the ion-exchanged purified water generated from the mixed resin layer is removed, said method further comprising regenerating said strongly basic anion exchange resin by flowing a caustic alkali solution therethrough, and regenerating said strongly acidic cation exchange resins of said mixed resin layer and said polisher portion by flowing a mineral acid solution therethrough;

washing said anion and cation exchange resins of said mixed resin layer and said hydrogen type strongly acidic cation exchange resin of said polisher portion; and mixing said strongly acidic cation exchange resin and said strongly basic anion exchange resin of said mixed resin layer by supplying a gas from a lowermost portion of said strongly acidic cation exchange resin of said mixed resin layer.

* * * * *